United States Patent [19]
Wedmore et al.

[11] 3,983,339
[45] Sept. 28, 1976

[54] DYNAMIC SPEED OF ANSWER RECORDER

[75] Inventors: William R. Wedmore, Glen Ellyn; Dennis H. Verbeek, Lisle, both of Ill.

[73] Assignee: GTE Automatic Electric Laboratories Incorporated, Northlake, Ill.

[22] Filed: Nov. 28, 1975

[21] Appl. No.: 636,385

[52] U.S. Cl. .......................... 179/175.2 C; 179/8 A
[51] Int. Cl.² .......................................... H04M 3/36
[58] Field of Search .......... 179/175.2 C, 1 MN, 8 R, 179/8 A

[56] References Cited
UNITED STATES PATENTS

| | | | |
|---|---|---|---|
| 3,155,781 | 11/1964 | Ulmer | 179/175.2 C |
| 3,297,829 | 1/1967 | Germanton | 179/27 D |
| 3,328,538 | 6/1967 | Germanton | 179/175.2 C |
| 3,525,818 | 8/1970 | Jaeger et al. | 179/175.2 C |

*Primary Examiner*—Douglas W. Olms

[57] ABSTRACT

The disclosure relates to a monitoring system for monitoring the average wait time for service in a toll telephone operating system of the type which includes a plurality of access trunks which are conditioned by subscribers upon initiating calls for service, a plurality of operator positions for servicing the calls for service, a switch network for connecting the calls for service to available operator positions, and a network control for controlling the switch network. The system includes means for detecting and storing the total number of outstanding calls for service awaiting service by an operator position during a most recent preset time interval and means for detecting and storing the total number of calls for service which have been connected to operator positions during the most recent preset time interval. The system also includes means for updating the total number of outstanding calls for service and the total number of calls serviced at predetermined time periods. At the end of each of the predetermined time periods a dividing means divides the total number of outstanding calls for service by the total number of calls serviced to provide a signal having a signal proportional to the average wait time for service. The average wait times are then displayed on a pen recorder.

13 Claims, 1 Drawing Figure

U.S. Patent   Sept. 28, 1976   3,983,339
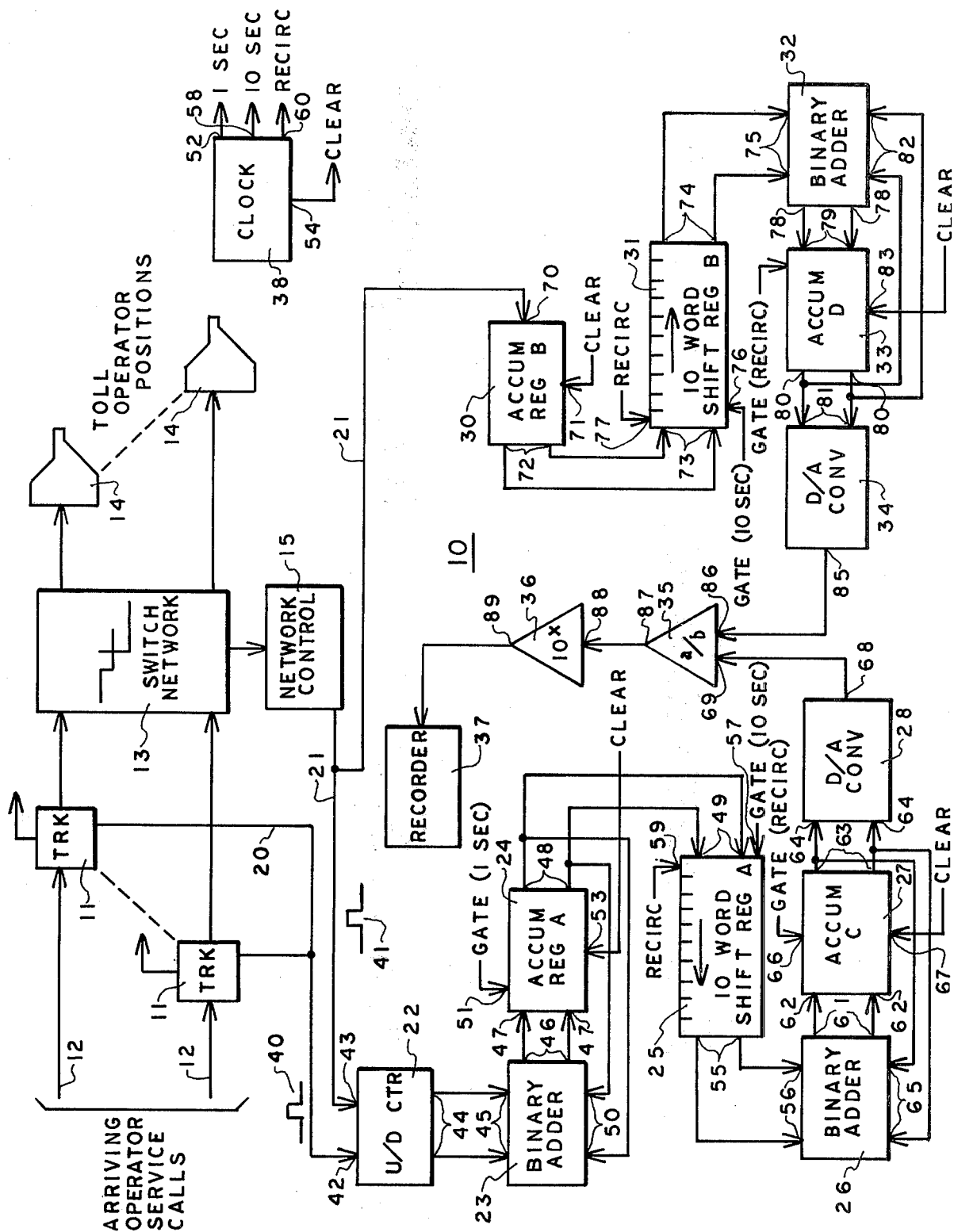

DYNAMIC SPEED OF ANSWER RECORDER

BACKGROUND OF THE INVENTION

The present invention is directed to a monitoring system for monitoring the average wait time for service in a toll telephone operating system. The invention is more particularly directed to a monitoring system for monitoring the average wait time for service in a toll telephone operating system to provide continuous knowledge of the required number of operator positions to efficiently service requested calls for service.

In toll telephone operating systems the necessary number of available operator positions to service requested calls for service to efficiently respond to traffic loads varies radically throughout a normal business day. For example, it is not uncommon for the number of required available operator positions to double every half hour while approaching a morning traffic load peak. In the past, in order to cope with this problem, operator personnel work schedules have generally been arranged to have the required operator personnel available to meet the expected average traffic characteristics. Because the actual traffic conditions never match the average for which the operator personnel work force is scheduled it has been necessary in the past to either overstaff with operator personnel, and thus have personnel not fully used, or to understaff and have the average wait time for service encountered by the subscribers to be much longer than desirable.

To overcome these deficiencies it is therefore desirable to provide a means whereby managing personnel may have continuous knowledge of the work load impressed upon the operator personnel work force. This would allow such managing personnel to make adjustments in the number of available operator positions and maintain a constant level of service. It would be most desirable to have such monitoring position continuously in operation such that dynamic diversion of operator personnel through revision of "break" schedules and reassignment to and from non-operating tasks can be achieved with a net reduction in required personnel.

It is therefore an object of the present invention to provide a monitoring system for monitoring the average wait time for service encountered by subscribers in a toll telephone operating system.

It is a still further object of the present invention to provide a monitoring system for monitoring the average wait time for service in a toll telephone operating system which has response times such that the need for corrections in the number of required operator positions and the responses thereto may be quickly realizable.

It is a still further object of the present invention to provide a monitoring system for monitoring the average wait time for service in a toll telephone operating system which provides an average wait time for service in a toll telephone operating system over a period longer than the time required to service a single call for service to prevent wide excursions in the average wait time indication provided thereby to thus increase the monitoring accuracy during light traffic periods.

It is a still more particular object of the present invention to provide a monitoring system for monitoring the average wait time for service in a toll telephone operating system which provides average wait times which are instantaneously readable and interpretable.

It is a still further particular object of the present invention to provide a monitoring means for monitoring the average wait time for service in a toll telephone operating system which provides an historical record of the average wait times obtained.

SUMMARY OF THE INVENTION

The invention provides a monitoring system for monitoring the average wait time for service in a toll telephone operating system of the type including a plurality of access trunks adapted to be conditioned by subscribers for initiating calls for service, a plurality of operator positions for servicing the subscriber calls for service, a switch network for connecting the calls for service to the available operator positions, and a network control for controlling the connections established by the switch network. The monitoring system comprises first means coupled to the access trunks for providing a pulse responsive to each call for service, second means coupled to the network control for providing a pulse responsive to each connection of a call for service at the trunks to an operator position, and first counting means coupled to the first and second means and responsive to the first and second means pulses whereby the contents of the first counting means represents the total number of outstanding calls for service. The monitoring system also comprises first adding means coupled to the first counting means for adding the contents of the first counting means at periodic intervals during predetermined time periods of a fixed duration to thereby provide a first added count at the end of each of the predetermined time periods, first storing means coupled to the first adding means for storing a given number of the last first added counts provided by the first adding means, and second adding means coupled to the first storing means for adding the given number of the first added counts stored in the first storing means at the end of each of the predetermined time periods to thereby provide a first total count at the end of each of the predetermined time periods. The monitoring system further includes second counting means coupled to the network control and responsive to the second means pulses for accumulating the second means pulses during each predetermined time period whereby the contents of the second counting means represents a second added count which is the total number of calls for service at the trunks which have been connected to an operator position during each respective predetermined time period, second storing means coupled to the second counting means for storing the given number of the last second added counts provided by the second counting means, third adding means coupled to the second storing means for adding the given number of the second added counts stored in the second storing means at the end of the predetermined time periods to thereby provide a second total count at the end of each of the predetermined time periods. The monitoring system of the present invention still further includes dividing means coupled to the first adding means and to the third adding means for dividing the first total count by the second total count at the end of the predetermined time periods to thereby provide a quotient at the end of the predetermined time periods which represents the average wait time for service and display means coupled to the dividing means for periodically displaying the quotient.

BRIEF DESCRIPTION OF THE DRAWINGS

The features of the present invention which are believed to be novel are set forth with particularity in the appended claims. The invention, together with further objects and advantages thereof, may best be understood with reference to the following description taken in conjunction with the accompanying drawing, in which the single FIGURE is a schematic representation of a monitoring system embodying the present invention.

DESCRIPTION OF THE PREFERRED EMBODIMENT

Referring now to the sole FIGURE, the monitoring system generally designated at 10 which embodies the present invention is shown in operative relationship with a toll telephone operating system of the type well known in the art which comprises a plurality of access trunks 11 which are coupled to the subscribers through a cross point matrix, which cross point matrix is connected to the access trunks over lines 12. As well known in the art, the access trunks 11 are adapted to be conditioned by subscriber calls for service. The toll telephone operating system, also includes a switch network 13 which connects the calls for service initiated by the subscribers at the access trunks 11 to the available operator positions 14 which are associated with operator personnel for servicing the incomming calls for service. A network control 15 is coupled to the switch network 13 and in a known manner controls the connections established by the switch network 13.

The monitoring system 10 comprises a first means or line 20, a second means or line 21, a first counting means comprising up-down counter 22, first adding means comprising a first binary adder 23 and and a first accumulating register 24, a first storing means comprising shift register 25, a second adding means comprising a second binary adder 26 and second accumulating register 27, digital-to-analog converter 28, second counting means comprising a fourth accumulating register 30, second storing means comprising shift register 31, third adding means comprising third binary adder 32 and the third accumulating register 33, digital-to-analog converter 34, dividing means comprising divider 35, logrithmic amplifier 36, pen recorder 37, and clock 38.

Line 20 is coupled to each of the access trunks and provides a pulse as indicated at 40 which it receives from the access trunks responsive to each call for service initiated by a subscriber. In a like manner, line 21 is coupled to the network control 15 and provides a pulse 41 received from the network control 15 responsive to each connection of a call for service at the trunks to an available operator position 14.

Up-down counter 22 has an up-count input 42 coupled to line 20 and a down-count input 43 coupled to line 21. Up-down counter 22 therefore contains at all times the number of trunks that have been conditioned for service but are yet to be served by an operator position. In other words, the contents of up-down counter 22 represents the total number of outstanding calls for service.

Up-down counter 22 has an output 44 coupled to a first input 45 of binary adder 23. Binary adder 23 also has an output 46 coupled to input 47 of accumulator register 24. Accumulator register 24 has an output 48 coupled to input 49 of shift register 29 and also to input 50 of binary adder 23. Accumulator register 24 has a gate input 51 coupled to output 52 of clock 38 which provides clock pulses which are spaced apart by periodic intervals of one second and which have a short time duration compared to the one second interval. Accumulator register 24 also has a clear input 53 coupled to clear output 54 of clock 38.

Shift register 25 is preferably a ten word shift register and has an output 55 coupled to input 56 of binary adder 26. Shift register 25 also has a gate input 57 coupled to output 58 of clock 38 to receive therefrom gating pulses which are separated in time by predetermined time periods of a fixed duration of ten seconds. Shift register 25 also has a recirculate input 59 coupled to recirculate output 60 of clock 38. Clock 38 at ten second intervals provides a recirculate output 60 a burst of ten short pulses which transfer the information contained within the ten word shift register 25 into binary adder 26 and recirculates the ten words of information so that the contents of the shift register may be left in tact updated by one new word.

Binary adder 26 has an output 61 coupled to input 62 of accumulator register 27. Accumulator register 27 has an output 53 coupled to input 64 of digital-to-analog converter 28 and also to input 65 of binary adder 26. Accumulating register 27 also has a recirculate gate input coupled to output 60 of clock 38 and clear input 67 coupled to clear output 54 of clock 38.

Digital-to-analog converter 28 has an output 68 coupled to input 69 of divider 35 and provides divider 35 with a first analog signal which forms the numerator of the quotient provided by divider 35.

The fourth accumulating register 30 has an input 70 coupled to line 21 and therefore accumulates or counts the total number of calls for service which have been connected to an operator position during each of the predetermined time periods of ten seconds. Accumulating register 30 also has a clear input 71 coupled to clear output 54 clock 38 and output 72 coupled to input 73 of shift register 31. Shift register 31 is also preferably a ten word shift register having an output 74 coupled to input 75 of the third binary adder 32. Shift register 31 additionally has a gate input 76 coupled to output 58 of clock 38 and a recirculate input 77 coupled to recirculate output 60 of clock 38.

Binary adder 32 has an output 78 coupled to input 79 of the third accumulating register 33. Accumulating register 33 has an output 80 coupled to input 81 of digital-to-analog converter 34 and also to input 82 of the third binary adder 32. Accumulating register 33 also has a clear input 83 coupled to clear output 54 of clock 38 and a recirculate input 84 coupled to recirculate output 60 of clock 38. Digital-to-analog converter 34 has an output 85 coupled to input 86 of divider 35 and provides a second analog signal which forms the denominator of the quotient provided by divider 35. Divider 35 has an output 87 coupled to input 88 of log amplifier 36 which in turn has an output 89 coupled to the pen recorder 37. Log amplifier 36 receives at input 88 a signal having a magnitude proportional to the average wait time for service and converts that signal to a fourth signal having a magnitude proportional to the log of the signal at input 88 to be recorded on pen recorder 37.

Pen recorder 37 preferably is equipped with three cycle log paper moving at a rate of 12 inches per hour. Thus the range of the paper within the pen recorder is 0.1 to 100.

In operation, the monitoring system as represented in the sole FIGURE displays on a running strip chart of pen recorder 37 the average wait time of dynamic speed of answer as measured in seconds. The speed of answer parameter is the direct measure of the toll telephone operating system performance as it is the measure of the subscribers waiting time for operator services. It has been found in practice that the preferable speed of answer to afford an efficient system is two seconds.

The monitoring system is effective in a dynamic sense because it satisfies a number of characteristics. First, the monitoring system of the sole FIGURE has responsive times in the order of one to two minutes so that the need for available operator position corrections and responses thereto may be quickly realized. Second, the monitoring system of the preferred embodiment determines the average wait time over a period longer than the work time of a single call to prevent wide excursions in the average wait time indications during very light traffic periods. Third, by use of the strip chart, the results of the average weight time determination are instantaneously readable and interpretable. Lastly, the strip chart provides an historical record so that the performance of the toll telephone operating system adjustment procedures may be evaluated.

As previously mentioned, each time there is a call for service initiated by a subscriber at one of the trunks 11, a pulse 40 is produced on line 20 and is impressed upon the up-count input 42 of up-down counter 22. Also, when a call for service at one of the trunks is connected to an available operator position by the switch network 13 under the control of network control 15, the network control provides a pulse 41 on line 21 which is impressed upon the down-count input 43 of up-down counter 22. Thus, the contents of up-down counter 22 represents the total number of outstanding calls for service.

At periodic intervals of one second, during a predetermined time period of ten seconds, the first adding means comprising binary counter 23 and accumulating register 24 adds the contents of up-down counter 22 to provide a first added count at the end of each of the predetermined time periods of 10 seconds. Each second, clock 38 provides at output 52 a pulse which is impressed upon gate input 51 of accumulating register 24 to gate the contents of counter 22 through binary adder 23 and into accumulating register 24. The output 48 of accumulating register 24 is coupled to input 50 of binary adder 23 such that when the contents of counter 22 is passed to the binary adder 23, the previously added sum present in the accumulator register 24 is added to the new one second count provided by counter 22 so that after ten seconds accumulator register 24 contains, in binary form, the sum of the values from counter 22 as seen at the one second sample rate. This sum represents call-queue-seconds of subscriber waiting time for an operator position.

At the end of each of the ten second predetermined time periods clock 38 at output 58 provides a pulse at input 57 of shift register 25 which transfers the contents of accumulator register 24 into shift register 25. After the contents of accumulating register 24 is transfered through the ten word shift register 25, clock 38 provides at output 54 a clearing pulse which is impressed upon input 53 of accumulating register 24 to clear accumulating register 24 and condition it for providing a new 10 second total. After this procedure is repeated ten times over a 100 second period, ten word shift register 25 will have stored the last ten added counts most recently provided by accumulating register 24.

Also at 10 second intervals clock 38 provides a burst of 10 closely spaced pulses at recirculate output 60 which are impressed upon input 59 of shift register 25 and input 66 of accumulating register 27. At the occurrence of each such pulse, one of the added counts out of the 10 added counts in shift register 25 is transfered to binary adder 26 and into accumulating register 27. Also at the occurrence of each such pulse the previous sum is transfered from output 63 of accumulating register 27 to input 65 of binary adder 26 so that the newly entered added count may be added to the previously added counts so that after all 10 pulses, accumulating register 27 contains the total call-queue-seconds of waiting time for the most recent 100 second period. The recirculating pulses provided by clock 38 also causes the 10 added counts in shift register 25 to be recirculated. As a new added count is entered into shift register 25 from accumulating register 24 at each predetermined 10 second interval, the contents of shift register 25 is updated every ten seconds. Therefore, the contents of accumulating register 27 represents the total call-queue-seconds of waiting time of the most recent one hundred second period updated at 10 second intervals. At the end of each 10 second interval, clock 38 provides an output 54 a clearing pulse impressed upon input 57 of accumulating register 27 to clear the accumulating register 27. However, the previously entered nine added counts in shift register 25 are not lost because they have been recirculated within the shift register with the tenth added count being added from the accumulating register 24.

The contents of accumulating register 27 may be referred to as a first total count which is in binary form. Digital-to-analog converter 28 converts the first total counts to first analog signals having a magnitude proportional to the value of the first total counts.

Simultaneously, accumulating register 30 counts the total number of calls for service which have been connected to an operator position by the switch network 13 under the control of network control 15 during each ten second period. At the end of each ten second period, clock 38 provides at output 58 a pulse which is impressed upon input 76 of 10 word shift register 31 transfering the contents of accumulating register 30 to 10 word shift register 31. After each such transfer, accumulating register 30 is cleared by clock 38 at its input 71. Each of the ten second counts in accumulating register 30 may be referred to as second added counts.

After this procedure is repeated ten times for one hundred seconds, shift register 31 will contain the last ten added counts provided by accumulating register 30. Each of the second added counts represents the number of calls for service handled in each of the 10 most recent 10 second periods.

At 10 second intervals, clock 38 provides a burst of 10 closely spaced pulses at recirculate output 60 which are impressed upon input 77 of shift register 31 and input 84 of accumulating register 33. At the occurrence of each such pulse one of the second added counts contained within shift register 31 is transfered to binary adder 32 and into accumulating register 33. Accumulating register 33 has an output 80 coupled to input 82 of binary adder 32 so that at the occurrence of each such pulse of the newly entered second added count is added to the sum of the previously entered second added counts so that after all 10 second added counts have been entered into binary adder 32 and accumulating register 33, accumulating register 33 will contain a binary number herein referred to as second total counts which represents the total calls for service handled in most recent one hundred second period updated at ten second intervals. At the end of each ten second interval clock 38 provides at output 58 a clearing pulse which is impressed upon input 83 of accumulating register 33 to clear accumulating register 33. However, the previous second added counts are not lost because they have been recirculated within shift register 31 and updated with a new second added count provided by accumulating register 30.

Accumulating register 33 has an output 80 coupled to input 81 of digital-to-analog converter 34 which converts the second total counts to second analog signals having a magnitude proportional to the value of the second total counts.

Digital-to-analog converter 28 has an output 68 coupled to input 69 of divider 35 and digital-to-analog converter 34 has an output 85 coupled to input 86 of divider 35. Divider 35 therefore provides at its output 87 a third analog signal which is proportional to the quotient of the first total count and second total count. The first total counts form the numerator of the quotient and the second total counts form the denominator of the quotient. The third signal at output 87 of divider 35 represents call-queue-seconds divided by the calls handled as averaged over the past 100 seconds. This signal will change or be updated each ten seconds. The result of this division is the average wait time for service in seconds that each call subscriber has experienced during the last 100 second period.

Output 87 of divider 35 is coupled to input 88 of log amplifier 36 so that log amplifier 36 provides at output 89 a fourth signal having a magnitude proportional to the log of the magnitude of the third signal. The fourth signal is transfered to the pen recorder 37 wherein the pen recorder displays the resulting average wait time on a running chart where the result is traced on log paper having a three decade range (0.1 to 100 seconds).

Because the object is to maintain the average wait time at approximately two seconds, and because two seconds appear on the log paper substantially in the center of the log paper, diviations from center or the desired wait time may be readily detected. Also, because the average wait time is being recorded on a running chart recorder, the average wait times are in such a condition as to provide an historical record of system performance.

While a particular embodiment of the invention has been shown and described, it will be obvious to those skilled in the art that changes and modifications may be made without departing from the invention in its broader aspects and therefore, the aim in the appended claims is to cover all such changes and modifications as fall within the true spirit and scope of the invention.

We claim:

1. In a toll telephone operating system of the type including a plurality of access trunks adapted to be conditioned by subscribers for initiating calls for service, a plurality of operator positions for servicing the subscriber calls for service, a switch network for connecting the calls for service to the available operator positions, and a network control for controlling the connections established by the switch network, a monitoring system for monitoring the average wait time for service comprising:

first means coupled to each of the access trunks for providing a pulse responsive to each call for service;

second means coupled to the network control for providing a pulse responsive to each connection of a call for service at the trunks to an operator position;

first counting means coupled to said first and second means and responsive to said first and second means pulses whereby the contents of said first counting means represents the total number of outstanding calls for service;

first adding means coupled to said first counting means for adding the contents of said first counting means at periodic intervals during predetermined time periods of a fixed duration to thereby provide a first added count at the end of each of said predetermined time periods;

first storing means coupled to said first adding means for storing a given number of the last said first added counts provided by said first adding means;

second adding means coupled to said first storing means for adding said given number of said first added counts stored in said first storing means at the end of each of said predetermined time periods to thereby provide a first total count at the end of each of said predetermined time periods;

second counting means coupled to the network control and responsive to said second means pulses for accumulating said second means pulses during each said predetermined time period whereby the contents of said second counting means represents a second added count which is the total number of calls for service at the trunks which have been connected to an operator position during each respective predetermined time period;

second storing means coupled to said second counting means for storing said given number of the last said second added counts provided by said second counting means;

third adding means coupled to said second storing means for adding said given number of said second added counts stored in said second storing means at the end of said predetermined time periods to thereby provide a second total count at the end of each of said predetermined time periods;

dividing means coupled to said first adding means and to said third adding means for dividing said first total count by said second total count at the end of said predetermined time periods to thereby provide a quotient at the end of said predetermined time periods which represents the average wait time for service; and display means coupled to said dividing means for periodically displaying said quotient.

2. A monitoring system in accordance with claim 1 wherein said periodic intervals are one second intervals and wherein said fixed duration of said predetermined time periods is 10 seconds.

3. A monitoring system in accordance with claim 2 wherein said given number is 10.

4. A monitoring system in accordance with claim 1 wherein said first counting means comprises an up-down counter having an up-count input and a down-count input, and wherein said up-count input is coupled to said first means and said down-count input is coupled to said second means.

5. A monitoring system in accordance with claim 4 wherein said first adding means comprises a first binary adder and a first accumulating register, said first binary adder having first and second inputs and an output, said first accumulating register having an input and an output, and wherein said first input of said first binary adder is coupled to said first counter, said second input of said first binary adder is coupled to said output of said first accumulating register, said output of said first binary adder is coupled to said input of said first accumulating register and said output of said first accumulating register is also coupled to said first storing means.

6. A monitoring system in accordance with claim 5 wherein said first storing means comprises a first shift register having an input and an output and wherein said input of said first shift register is coupled to said output of said accumulating register first and wherein said output of said first shift register is coupled to said second adding means.

7. A monitoring system in accordance with claim 6 wherein said second adding means comprises a second binary adder and a second accumulating register, said second binary adder having first and second inputs and an output, said second accumulating register having input and output and wherein said first input of said second binary adder is coupled to said output of said first shift register, said second input of said second binary adder is coupled to said output of said second accumulating register, said output of said second binary adder is also coupled to said input of said second accumulating register and said output of said second accumulating register is coupled to said dividing means.

8. A monitoring system in accordance with claim 7 further comprising a first digital-to-analog converter, and wherein said first digital-to-analog converter couples said output of said second accumulating register to said dividing means.

9. A monitoring system in accordance with claim 8 wherein said second storing means comprises a second shift register having an input and an output and wherein said input of said second shift register is coupled to said second counting means and said output of said second shift register is coupled to said third adding means.

10. A monitoring system in accordance with claim 9 wherein said third adding means comprises a third binary adder and a third accumulating register, said third binary adder having first and second inputs and an output, said third accumulating register having an input and an output, and wherein said first input of said third binary adder is coupled to said output of said second shift register, said second input of said third binary adder is coupled to said output of said third accumulating register, said output of said third binary adder is coupled to said input of said third accumulating register, and said output of said third accumulating register is also coupled to said dividing means.

11. A monitoring system in accordance with claim 10 further comprising a second digital-to-analog converter, and wherein said second digital-to-analog converter couples said output of said third accumulating register to said dividing means.

12. A monitoring system in accordance with claim 11 wherein said first and second digital-to-analog converters convert said first and second total counts to first and second analog signals respectively and wherein said dividing means provides third analog signal which is proportional to said quotient.

13. A monitoring system in accordance with claim 12 wherein said display means comprises a logrithmic amplifier coupled to said divider for converting said third signal to a fourth signal having a magnitude which is proportional to the log of the magnitude of said third signal and a pen recorder for recording said quotient responsive to said fourth signal.

* * * * *